United States Patent
Byrne et al.

(10) Patent No.: US 10,673,857 B2
(45) Date of Patent: Jun. 2, 2020

(54) DYNAMICALLY CHANGING ACCESS RULES FOR CONTEXT-SENSITIVE ACCESS CONTROL

(71) Applicant: International Business Machine Corporation, Armonk, NY (US)

(72) Inventors: Alan Byrne, Mulhuddart (IE); Paul Connolly, Castleknock (IE); Bryan D. Osenbach, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 235 days.

(21) Appl. No.: 15/475,348

(22) Filed: Mar. 31, 2017

(65) Prior Publication Data

US 2018/0288061 A1   Oct. 4, 2018

(51) Int. Cl.
  *G06F 21/00*  (2013.01)
  *H04L 29/06*  (2006.01)
  *H04W 4/90*  (2018.01)

(52) U.S. Cl.
  CPC ............ *H04L 63/102* (2013.01); *H04L 63/20* (2013.01); *H04W 4/90* (2018.02)

(58) Field of Classification Search
  CPC .............................. H04L 63/102; H04L 63/20
  USPC ............................................................ 726/1
  See application file for complete search history.

(56) References Cited

U.S. PATENT DOCUMENTS 5,263,158 A   11/1993 Janis
6,591,265 B1   7/2003 Erickson et al.
7,249,176 B1   7/2007 Salas et al.
8,387,117 B2   2/2013 Eom et al.
9,087,148 B2   7/2015 Giblin et al.
9,130,920 B2   9/2015 Pelykh
9,426,182 B1   8/2016 Zeljko et al.
9,460,300 B1   10/2016 Kissner et al.
(Continued)

FOREIGN PATENT DOCUMENTS

CN          103020498 A    4/2013
WO     WO2015047338 A1    4/2015

OTHER PUBLICATIONS

Han, W. et al., "Context-sensitive access control model and implementation," in IEEE 5th Int'l. Conf. on Computer and Information Technology (CIT 2005), pp. 751-756, 2005.
(Continued)

*Primary Examiner* — Shewaye Gelagay
*Assistant Examiner* — Kevin Ayala
(74) *Attorney, Agent, or Firm* — Cuenot, Forsythe & Kim, LLC

(57) ABSTRACT

A system, method and computer program product obtains user data relating to a plurality of system users, who have previously been granted access to a resource in a context without complying with a ruleset defining criteria for automatically accessing the resource in the context. A combination of two or more user data properties having common values in user data of a subset of two or more of the plurality of system users is identified. A determination of whether the number of system users in the subset exceeds a predetermined threshold is made. If the number of system users in the subset exceeds the predetermined threshold, the ruleset is updated to include criteria based on the identified combination of two or more user data properties.

17 Claims, 5 Drawing Sheets

(56) References Cited

U.S. PATENT DOCUMENTS

| | | | |
|---|---|---|---|
| 9,641,334 B2* | 5/2017 | Faitelson | G06F 9/468 |
| 2006/0230282 A1 | 10/2006 | Hausler | |
| 2008/0109871 A1* | 5/2008 | Jacobs | H04L 63/20 |
| | | | 726/1 |
| 2015/0046969 A1* | 2/2015 | Abuelsaad | G06F 21/41 |
| | | | 726/1 |
| 2015/0135258 A1* | 5/2015 | Smith | G06F 21/45 |
| | | | 726/1 |
| 2017/0032042 A1* | 2/2017 | Rykowski | G06F 17/30566 |
| 2018/0114015 A1* | 4/2018 | Nuseibeh | G06F 21/552 |

OTHER PUBLICATIONS

Corrad, A. et al., "Context-based access control management in ubiquitous environments," in IEEE Proc. of 3rd Int'l. Sym. on Network Computing and Applications (NCA 2004), pp. 253-260, 2004.

\* cited by examiner

DYNAMICALLY CHANGING ACCESS RULES FOR CONTEXT-SENSITIVE ACCESS CONTROL

BACKGROUND

The present disclosure relates to access control in a computing environment and, more specifically, to the management of access rules for access control based on context.

SUMMARY

According to an aspect of the present disclosure, a computer-implemented method is provided. The method obtains user data relating to a plurality of system users, who have previously been granted access to a resource in a context without complying with a ruleset defining criteria for automatically accessing the resource in the context. The method identifies a combination of two or more user data properties having common values in the user data of a subset of two or more of the plurality of system users. The method determines whether the number of system users in the subset exceeds a predetermined threshold. If the number of system users in the subset exceeds the predetermined threshold, the method updates the ruleset to include criteria based on the identified combination of two or more user data properties.

According to another aspect of the present disclosure, a system is provided. The system comprises a processing unit for updating user access rulesets. The processing unit is in communication with memory and at least one data source. The processing unit is configured to obtain, from a data source, user data relating to a plurality of system users, who have previously been granted access to a resource in a context without complying with a ruleset defining criteria for automatically accessing the resource in the context. The processing unit is further configured to identify a combination of two or more user data properties having common values in the user data of a subset of two or more of the plurality of system users. The processing unit is configured to determine whether the number of system users in the subset exceeds a predetermined threshold. The processing unit is further configured to update the ruleset to include criteria based on the identified combination of two or more user data properties, if the number of system users in the subset exceeds the predetermined threshold.

According to yet another aspect of the present disclosure, a computer program product is provided. The computer program product comprises a computer readable storage medium having program instructions embodied therewith. The program instructions are executable by a processor to cause the processor to: obtain user data relating to a plurality of system users, who have previously been granted access to a resource in a context without complying with a ruleset defining criteria for automatically accessing the resource in the context; identify a combination of two or more user data properties having common values in the user data of a subset of two or more of the plurality of system users; determine whether the number of system users in the subset exceeds a predetermined threshold, and update the ruleset to include criteria based on the identified combination of two or more user data properties, if the number of system users in the subset exceeds the predetermined threshold.

According to still another aspect of the present disclosure, a computer-implemented method is provided. The method retrieves a current ruleset defining criteria for automatically accessing a resource in a current context. The method obtains current user data for system users from a plurality of data sources relating to the ruleset. The method applies the ruleset to the user data to determine a subset of system users, who comply with the ruleset. The subset of users form a user access group for automatic access to the resource in the current context, which may be stored for use in controlling access to the resource in the current context.

BRIEF DESCRIPTION OF THE SEVERAL VIEWS OF THE DRAWINGS

Example implementations of the present disclosure will be described below with reference to the following drawings, in which.

DETAILED DESCRIPTION

Figure 1:
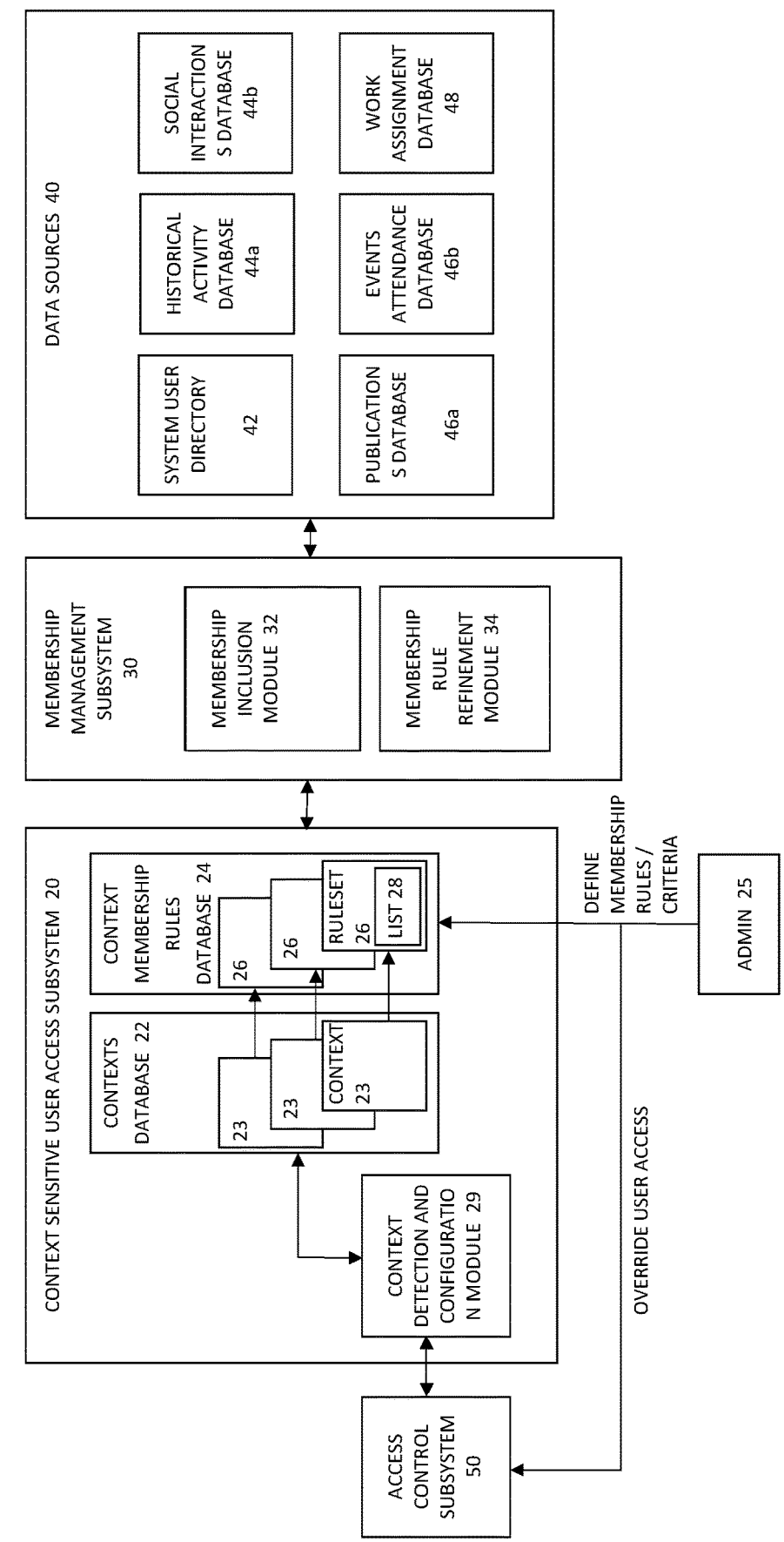
FIG. 1 is a schematic block diagram of a system for context-sensitive access control in accordance with example implementations of the present disclosure.

In computing environments, such as enterprise computing systems and networks, controlling access to computing resources is required not only to control usage of the associated memory and processing capacity, bandwidth and the like, but also for security of those resources and enterprise information. Computing resources typically comprise hardware, firmware and/or software of an enterprise environment. Access control is typically carried out automatically, by comparing properties of a profile associated with the user or entity seeking access against a predefined set of access rules (referred to herein as "rulesets"). For example, when accessing an enterprise environment by providing authentication information (e.g., username and password), a user is permitted to access only those resources consistent with properties of his or her user profile (e.g., job function, seniority) and access rulesets that define user profile properties required for access. As the skilled person will appreciate, a ruleset for access to a computing resource comprises one or more rules, which each define criteria that a user must satisfy in order to be permitted automatic access to the resource. Example rulesets and user profile properties are described further below. If a user wishes to seek access to a computing resource that is inconsistent with the access ruleset for that resource, a request for access may be made to a system administrator, who may grant access manually.

Context-sensitive access control provides additional flexibility for control of user access. In particular, different rulesets for access to a particular resource may be defined and used for different contexts. A context may be an operating state of the resource or the computing environment, a time of day or usage level of the resource or computing environment or some other context-related variable that dynamically changes over time. An example context is when an enterprise server is compromised or not operating normally. In this case, the server may enter a different operating state from its normal operating state (e.g., an "Emergency"

state), for which a different ruleset for access to the server is defined. For example, the access ruleset for the server in an Emergency state may restrict access to only a subset of those users who are allowed access to the server in the normal state.

In an Emergency state, users may be denied access to a computing resource, and, in consequence, access requests may be made to a system administrator. This places a burden on the system administrator's time. Moreover, users requesting access may include technical experts and other individuals, whose assistance is required to address the underlying technical problem or cause of the Emergency state. Such users need to be identified and quickly provided with access. However, access by such technical experts may be delayed due to the need for the system administrator to consider and handle each request individually and grant access manually. In consequence, resolution of the underlying technical problem may be delayed, and the performance of the computing environment may be adversely affected.

FIG. 1 is a schematic block diagram of a system 10 for context-sensitive access control, in accordance with example implementations of the present disclosure. System 10 comprises a context-sensitive user access subsystem 20 (for simplicity referred to herein as "user access subsystem") for determining user access groups (i.e., sets of system users), who are permitted automatic access to computing resources based on predefined criteria/rules, based on context. User access subsystem 20 includes a contexts database 22 comprising a plurality of predefined contexts 23 for the computing resources. User access subsystem 20 further includes a context membership & rules database 24 comprising membership rulesets 26 (for simplicity referred to herein as "rulesets"), which each comprise a ruleset based on criteria for user access to a resource in a particular context 23. A system administrator 25 may define or modify the contexts 23 and the criteria/rulesets 26. In particular, the contexts 23 and rulesets 26 may be initially defined by the system administrator 25 according to required access criteria, for example to meet one or more enterprise policies relating to the use and security of the computing resources. In addition, the rulesets 26 may be refined and updated automatically by machine learning techniques, as described herein. As the skilled person will appreciate, the contexts 23 and corresponding rulesets 26 may be stored in any other suitable memory accessible by user access subsystem 20.

In example implementations of the present disclosure as shown in FIG. 1, context membership & rules database 24 further comprises membership lists 28 (for simplicity referred to herein as "lists"). Each list 28 comprises a subset of system users satisfying a corresponding ruleset 26 for a particular context 23, who are therefore members of an access group complying with the ruleset. In particular, a list 28 of users permitted automatic access to a particular computing resource in a particular context 23 may be determined, by applying the corresponding ruleset 26 to the set of system users, in accordance with conventional context-based access control techniques as described below. In addition, the lists 28 may be updated automatically in response to updates of the rulesets 26 or otherwise, as described further below.

User access subsystem 20 further comprises context detection and configuration module 29. Context detection and configuration module 29 provides an interface between the user access subsystem 20 and an access control subsystem 50. Access control subsystem 50 directly controls user access to computing resources of the enterprise system or network (not shown) in accordance with a current detected context based on the corresponding list 28 stored in the context membership & rules database 24 of the user access subsystem 20.

System administrator 25 may communicate directly with access control subsystem 50. In particular, system administrator 25 may provide manual override commands (herein referred to as "overrides") to access control system 50 in response to individual system user requests for access. As the skilled person will appreciate, users who are manually granted access to a resource in a particular context do not conform to the corresponding ruleset 26 and so are not included in the corresponding list 28. Accordingly, such manual system administrator overrides constitute individual exceptions to the ruleset 26.

System 10 further comprises a plurality of data sources 40 comprising data relating to the set of system users (herein referred to as "user profile data" or simply "user data"). In particular, each data source 40 may comprise user profile data comprising values of generic or custom properties (i.e., data attributes) for system users. For example, data sources 40 may include a system user directory 42 (e.g., employee directory), which may define values of generic or custom properties of an employee profile associated with each system user (e.g., employee job function, seniority).

In addition, data sources 40 may include one or more databases comprising data relating to system users gathered from monitoring user interactions. For example, data sources 40 may include historical activity database 44a, comprising user profile data derived from monitoring user activity on the enterprise system or network (e.g., interactions and use of computing resources of the system), and social interactions database 44b, comprising user profile data derived from monitoring communications between users such as email, webchat and telephone communications. Historical activity database 44a and social interactions database 44b may define values of properties (i.e., data attributes) associated with interactions of system users, such as membership of a group or network.

Data sources 40 may further include one or more databases comprising data relating to the technical skills, training and experience of system users. For example, data sources 40 may include publications database 46a, comprising data derived from relevant publications (e.g., technical papers), including user profile data for users who are named authors and/or contributors in relevant publications. Data sources 40 may also include event attendance database 46b, comprising user profile data derived from lists of attendees at relevant events, such as technical meetings or training events.

Moreover, data sources 40 may include work assignment database 48, comprising user profile data derived from records of work assignments performed by system users and/or associated interactions. For example, work assignment database 48 may include data records of work assignments involving direct interactions of system users with a computing resource, such as hardware configuration or software or firmware source code changes.

Typically, the user profile data in the data sources 40 are dynamically updated over time, for example to add new system users and/or new user profile data, or to remove system users. As the skilled person will appreciate, any combination of the above example data sources 40 and any other suitable data sources for deriving user profile data relating to system users, may be used in example implementations of the present disclosure, according to application and/or user requirements.

In accordance with example implementations of the present disclosure, system 10 further includes membership management subsystem 30. In particular, membership management subsystem 30 comprises membership inclusion module 32 (referred to herein as "inclusion module") and membership rule refinement module 34 (referred to herein as "rule refinement module").

Membership inclusion module 32 receives user profile data relating to system users from data sources 40, the membership rulesets 26 currently stored in the context membership & rules database 24, and corresponding contexts 23 currently stored in the contexts database 22, from user access subsystem 20. Inclusion module 32 applies each ruleset 26 for a particular context 23 to the system user data and determines membership of the corresponding access group, as the abovementioned list 28 for storage in the context membership & rules database 24. Accordingly, each list 28 comprises a subset of system users, who are members of the corresponding access group and so are permitted automatic access to a resource in a particular context 23, consistent with the corresponding ruleset 28 (i.e., as defined by an enterprise policy or other user-defined membership criteria).

Membership rulesets 22 may be defined using the following example generic format:

```
"ruleset-name": [
    [ // This is a datasource set. A datasource set is 1 or more datasources
    that should have logical "AND" applied to the result of the rules from
    each datasource.
        {
            "datasource": "<datasource>",
            "rules": [
                [ // This is a rule set. A rule set is 1 or more rules that should
                have logical "AND" applied to the result of the rules.
                    {
                        "property" :"<property of datasource>",
                        "value": "<value of property>",
                        "condition": "<equal|greater-than|less-than|contains>"
                    },
                    ... //more optional rules to be "AND"ed together.
                ],
                [ <optional rules to be "OR"ed to the above rules> ]
                ...
            ]
        },
        ... //more optional datasources to be "AND"ed together.
    ],
    [ <optional datasources to be "OR"ed to the above datasources> ]
    ...
]
```

By way of example, a ruleset 22 for access to an identity management server (herein referred to as "IMS") in a context when the server is not functioning correctly (herein referred to as "IMS Emergency") may be predefined by a system administrator as comprising those system users who are experts in the technology associated with the IMS (herein referred to as "IMS Experts"). Using the above example generic format, this ruleset (which comprises a single rule) may be defined as:

```
"IMS Experts": [
    [
        {
            "datasource": "employee_directory",
            "rules": [
                [ {"team": "imsDevelopment", "condition": "equals"} ]
            ]
        }
```

```
    ]
]
```

Thus, the ruleset called "IMS Experts" may be associated with the computing resource "IMS" in the context "IMS Emergency". In particular, the IMS Experts ruleset is defined as comprising system users in the employee directory 42 data source that are part of the IMS development team (employee job function parameter: "team=imsDevelopment"). Accordingly, inclusion module 32 may determine a membership list 28 in accordance with the ruleset "IMS Experts" 26, which may be used in permitting automatic access by system users to the IMS in the context IMS Emergency (i.e., when the IMS is in the Emergency operating state). Thus, when the IMS Emergency context becomes active, inclusion module 32 may query the data sources 40 for system user data (i.e., user profile data), which may be provided in the following generic format:

```
"datasource":
[
    {
        "Title": "<title>",
        "Person": "<name>",
        "Level": "<novice/intermediate/expert>",
        "Year": "<year>",
        "Keywords": ["<keyword>","<keyword>","<keyword>",...]
        "custom_prop1": "custom_value1",
        "custom_prop2": "custom_value2",
        ...
    },
    ...
]
```

As the skilled person will appreciate, the above format for user profile data for a system user with values of properties (i.e., data attributes), which are dependent on the data source 40. Typically, each data source 40 includes a system to aggregate the user data. For example, the aforementioned employee directory 42 typically contains data values for generic properties such as "Person": "<name>", and data values for custom properties such as "Grade": "<employee grade>" for each system user, which may be aggregated as user data in accordance with the above format. Similarly, the aforementioned publications database 46a may comprise user profile data determined by processing relevant publications from a database, and determining and storing, for each system user, a list of all publications in which the user is named as author, keywords defining the publications and a "level" (e.g., expert or beginner level publication) so as to provide user data in accordance with the above format. In another example, the aforementioned historical activity database 44a may comprise data derived from records of the active context when a user actually accessed a computing resource in the past, via custom properties or keywords, and provide user data in accordance with the above format.

Accordingly, inclusion module 32 may retrieve the user profile data for the system users from the data sources 40, and apply the ruleset 26 to the user data for the relevant context 23 to determine a list 28 of users that should have automatic access to the computing resource in the context. As the skilled person will appreciate, inclusion module 32 may store the determined lists 28 in any other suitable memory for access by the user access subsystem 20 as described above. Inclusion module 32 may use any suitable method for determining membership of user access groups based on membership rulesets 26 (or equivalent), who are permitted automatic access to computing resources in particular contexts. Once suitable method that may implemented by inclusion module 32 is described below with reference to FIG. 2.

Returning to FIG. 1, membership rule refinement module 34 receives user profile data relating to system users from data sources 40. In addition, rule refinement module 34 may receive rulesets 26 currently stored in the context membership & rules database 24, and corresponding contexts 23 currently stored in the contexts database 22, from user access subsystem 20. In accordance with example implementations of the present disclosure, rule refinement module 34 may dynamically refine (i.e., update) rulesets 26 for particular contexts 23 by machine learning, for example based on observed system administrator overrides of a ruleset 26 in a particular context 23. Accordingly, rule refinement module 34 may update a ruleset 26 to enable automatic access to a computing resource by certain additional system users in a particular context, where such access is warranted (e.g., an Emergency state or low usage time of day). This avoids the need for such additional system users to make individual requests to the system administrator for access in the particular context, such as an emergency state, thus saving time for both the users and the system administrator. Rule refinement module 34 may use any suitable method for refining (i.e., updating) rulesets 26 that permit automatic access to computing resources in different contexts 23. Suitable methods that may implemented by rule refinement module 34 are described below with reference to FIGS. 3 and 4.

Figure 2:
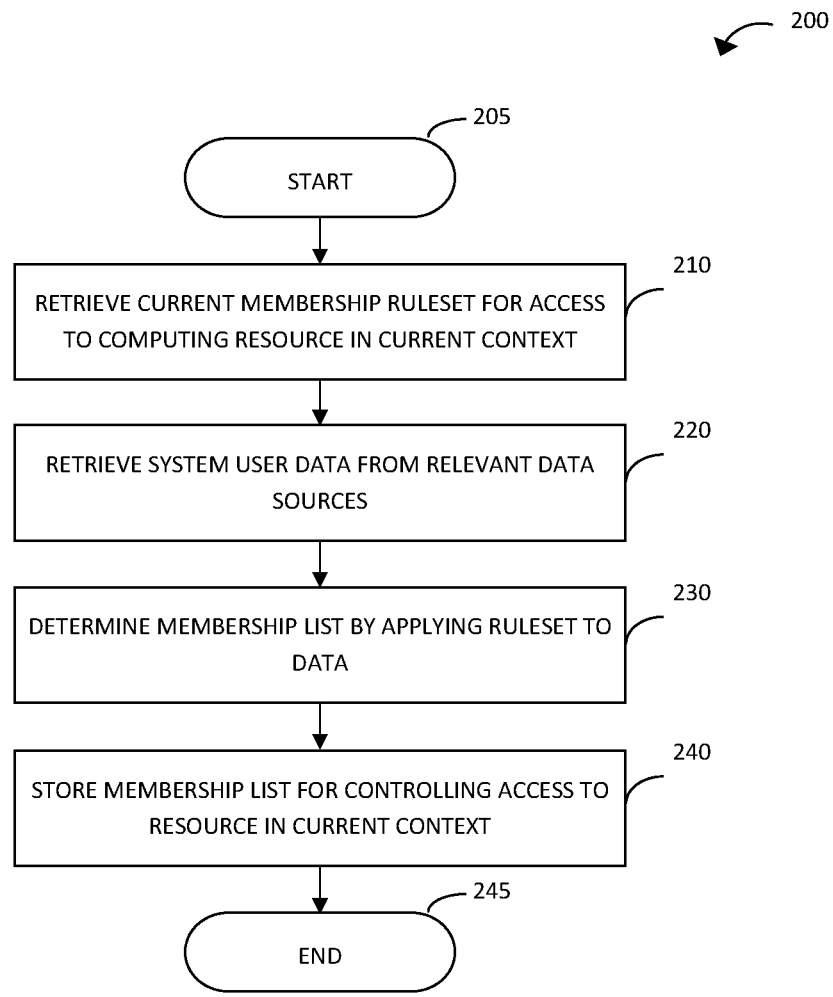
FIG. 2 is a flowchart of a method for determining context-based access membership in accordance with example implementations of the present disclosure.

FIG. 2 is a flowchart of a method 200 for determining context-based access membership in accordance with example implementations of the present disclosure. In some example implementations, the method 200 may be performed by the inclusion module 32 of the membership management subsystem 30 of the access control system 10 shown in FIG. 1 as described above.

The method 200 starts at step 205. In example implementations of the present disclosure, the method 200 may start at step 205 in response to a detected change in context of an identified computing resource, such as a change in operating state of the resource (e.g., a change from "normal" operating state to "Emergency" operating state). As the skilled person will appreciate, various other triggers for starting the method 200 at step 205 are possible and contemplated by the present disclosure.

At step 210, the method retrieves a current membership ruleset for access, by system users, to the computing resource in the current context. In particular, step 210 may retrieve a predefined ruleset from memory associated with a context-sensitive access control subsystem (or equivalent) for the identified computing resource and current context. In accordance with example implementations of the present disclosure, a ruleset may specify one or more access rules/criteria for compliance by system users, which may be determined using user profile data derived from one or more specified data sources, as described above.

At step 220, the method retrieves system user data from relevant data sources. In particular, step 220 may retrieve user data for the set of system users in each of the data sources specified in the ruleset. As described above, the user data provided by each data source may comply with a common format, including at least a user identifier (e.g., username) and values of custom properties (i.e., data attributes) associated with the user derived from the data source (e.g., job function, seniority level etc., from an employee directory).

At step 230, the method determines the membership list, comprising system users permitted automatic access to the resource in the current context based on the criteria defined in the ruleset. In particular, step 230 may apply the ruleset retrieved in step 210 to the system user data retrieved in step 220 in order to determine the subset of system users that satisfy the ruleset (i.e. access group) for inclusion in the list.

At step 240, the method stores the membership list determined in step 230. In particular, step 240 may store the list, containing at least the identifiers of the subset of system users that satisfy the ruleset, in memory for access by the context-sensitive access control subsystem (or equivalent) for controlling access to the resource in the current context. The method then ends at step 245.

As the skilled person will appreciate, unlike conventional context-sensitive access control techniques, the method of FIG. 2 uses multiple data sources to derive use profile data associated with system users. The use of multiple data sources, rather than a single data source, provides additional flexibility to define additional or alternative rules and combinations of rules as criteria in rulesets for different contexts. In addition, since the user profile data in each of the multiple data sources typically change over time, the method of FIG. 2 may be used to dynamically recalculate, and thus refine and update, the subset of system users permitted automatic access (i.e., the access group). Such updates of access groups may be performed for one or more contexts, either periodically, upon user request or otherwise, according to application and/or user requirements. Further advantages of the use of multiple data sources are discussed below.

Figure 3:
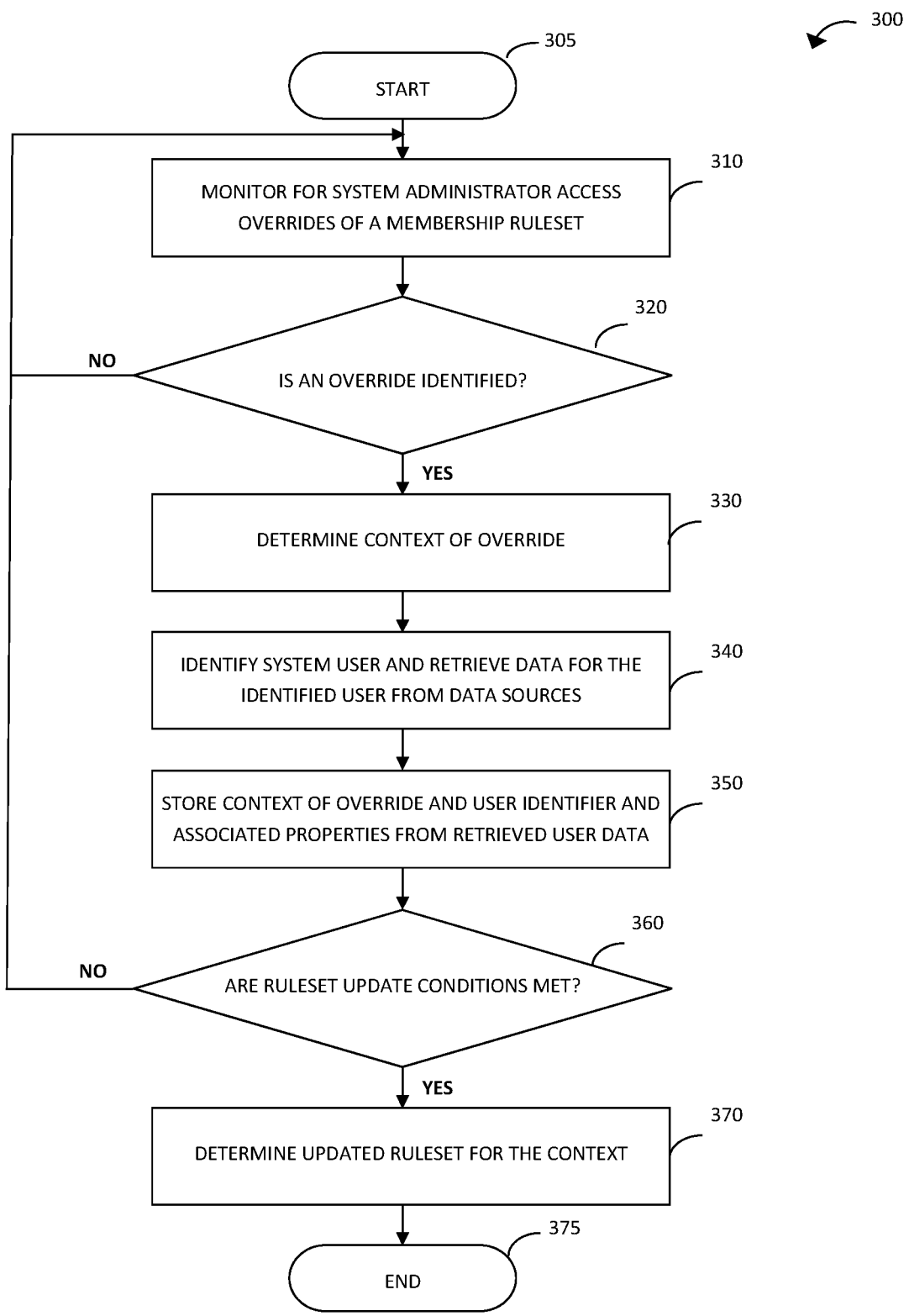
FIG. 3 is a flowchart of a method for monitoring user access in accordance with example implementations of the present disclosure.

FIG. 3 is a flowchart of a method 300 for monitoring user access in accordance with example implementations of the present disclosure. In some example implementations, the method 300 may be performed by the rule refinement module 34 of the membership management subsystem 30 of the access control system 10 shown in FIG. 1 and described above.

The method 300 starts at step 305. The method 300 may be performed continuously (e.g., for a predetermined time period), at periodic intervals, upon user request or otherwise according to application and/or user requirements.

At step 310, the method monitors for system administrator access overrides (herein referred to simply as "overrides") of a membership ruleset defining criteria for automatically accessing a resource in a context. In particular, as described above, a system administrator may manually grant access in response to an individual request by a user, who is denied automatic access when the ruleset is applied, thus overriding the ruleset as an individual exception. In example implementations, step 310 may monitor for system administrator overrides by monitoring the activities of the system administrator, such as manually granting access to resources in the predefined contexts in response to a user request. As the skilled person will appreciate, other suitable methods for monitoring for overrides are possible and contemplated by the present disclosure.

At step 320, the method determines whether an override is identified in step 310. If step 320 identifies an override, the method continues with step 330. Otherwise, the method returns to step 310 and continues to monitor for overrides.

At step 330, the method determines a context of the identified system administrator access override. In particular, as described above, the manual override by the system administrator is typically performed in response to a user request to access a computing resource in a certain context, such as a particular operating state of the resource or computing environment (e.g., Emergency operating state). Accordingly, step 330 may determine the context at the time of the override.

At step 340, the method identifies the system user, who is granted access by the identified system administrator access override, and retrieves user profile data for the identified system user from one or more data sources. As described above, multiple data sources may each aggregate user profile data relating to system users in accordance with a predefined format. Typically, the user data from each data source includes a user identifier and values of custom properties (i.e., data attributes) associated with the user, which together represent a user profile associated with the data source. Accordingly, in example implementations, step 340 may retrieve user data from one or more data sources in a predefined common format. In other example implementations, step 340 may retrieve raw or formatted user data from the data source and format the user data in a predefined common format.

At step 350, the method stores a data record for the override, comprising the context determined in step 330 and the user data (e.g., comprising a user identifier and associated properties and their values (i.e., data attributes)) retrieved in step 350. Typically, step 350 stores the data record comprising the context and user data in a database of historic access overrides for subsequent use.

At step 360, the method determines whether a condition for updating the membership ruleset for access to the computing resource in the context is met. Any suitable condition for updating the ruleset may be defined based on application and/or user requirements. For instance, a condition for an update may be after a predetermined number of recorded access overrides in the context have been identified over a time interval (e.g., access overrides for three unique system users in a time period of two hours). Other conditions may include a system administrator or other user request. If step 360 determines that a condition for update is not met, the method returns to step 310, which continues monitoring for further system administrator access overrides. However, if step 360 determines that a condition for update is met, the method continues with step 370.

At step 370, the method determines an updated membership ruleset for access to the resource in the context. In particular, step 370 may determine an updated ruleset based on stored user data relating to previous access overrides, such as user data in data records of the database of historic access overrides described above in relation to step 350. Any suitable method may be used for updating the ruleset based on the data associated with users, who have previously been granted access manually by the system administrator. One suitable method that may be used in step 370 is described below with reference to FIG. 4. As the skilled person will appreciate, other methods for updating the ruleset are possible and contemplated by the present disclosure. The method then ends at step 375.

As the skilled person will appreciate, step 330 may determine multiple contexts for an identified access override. Thus, the method 300 may be performed for each identified context or for a most relevant identified context, according to application and/or user requirements. As the skilled person will further appreciate, access overrides are not limited to manual overrides by a system administrator, but may include other processes for manual or automatic override of a ruleset for automatic access.

Figure 4:
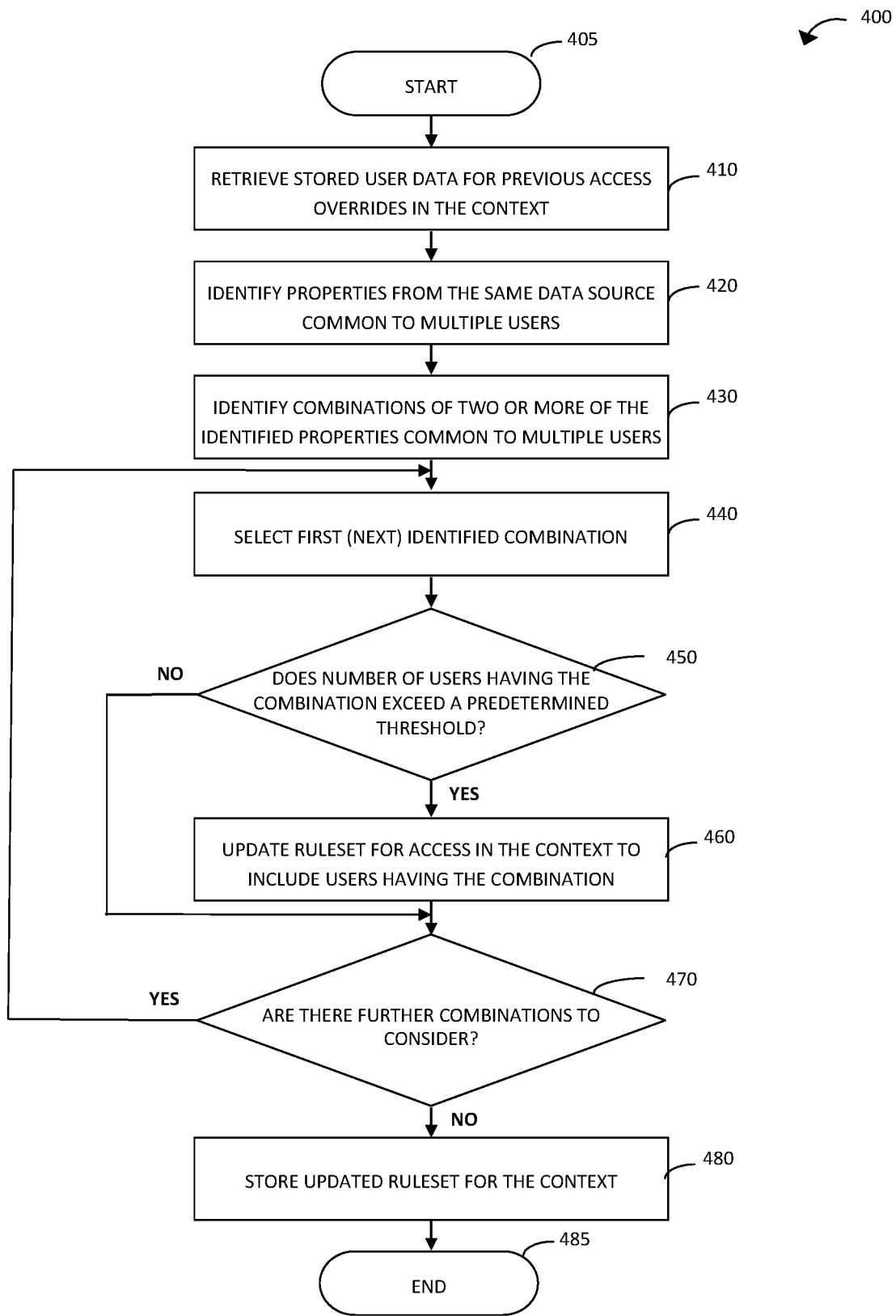
FIG. 4 is a flowchart of a method for updating context-based access membership rulesets in accordance with example implementations of the present disclosure.

FIG. 4 is a flowchart of a method 400 for updating context-based access membership rulesets in accordance with example implementations of the present disclosure. In some example implementations, the method 400 may be performed by the rule refinement module 34 of the membership management subsystem 30 of the access control system 10 shown in FIG. 1 and described above. The method 400 may be performed in conjunction with the method 300 of FIG. 3, for example in step 370 as described above.

The method starts at step 405. In example implementations, the method may start in response to a determination that a condition for updating a ruleset for a context is met, such as in accordance with step 360 of the method 300 of FIG. 3. In other example implementations, the method may start at periodic intervals, upon user request or otherwise, according to application and/or user requirements.

At step 410, the method retrieves stored user data for system users, who have previously been granted access by means of overrides of the ruleset for automatic access in the relevant context, by a system administrator or otherwise, and thus without complying with the ruleset. In example implementations, the step 410 may retrieve user data from a database relating to historic access overrides. Such user data may be previously stored in the database by step 350 of the method of FIG. 3, as described above.

At step 420, the method identifies properties (i.e., data attributes) from the same data source that are common to multiple system users from the retrieved user data. In particular, step 420 may compare data values for one or more properties of user data from the same data source for the different system users. Step 420 may identify common or matching data values of properties in the user data of at least two system users, based on the comparison. In example implementations, step 420 may further isolate the user data that include the identified common or matching data values for properties from at least one data source. In this way, step 420 may identify and/or isolate user data for a subset of system users, who have been previously granted override access in the context and that have the one or more user profile properties in common (e.g., the same user characteristics, such as technical skills, geographic location or the like).

At step 430, in accordance with example implementations, the method identifies combinations of two or more of the identified properties in common to multiple system users. In particular, step 430 may identify data values of two or more properties (i.e., data attributes) that are the same in the user data of at least two system users (e.g., from the user data isolated in step 420). As the skilled person will appreciate, a common data value for a single user data property may be insufficient to clearly represent the required characteristics of the system users, that led to the system administrator granting override access. Accordingly, step 430 identifies a combination of at least two common data values for different properties amongst the user data of multiple system users.

Step 430 may identify only certain predefined combinations (or combination types) of two or more common properties in the user data of multiple system users. For example, allowable combinations may comprise combinations of common properties from certain data sources and/or combinations of common properties including at least one property type. In some example implementations of the present disclosure, step 430 may identify only combinations of common data values for properties from multiple different data sources. As the skilled person will appreciate, step 430 may use any suitable technique to identify the required combinations of common user profile attributes according to application and/or user requirements. Thus, for example, step 430 may identify three or more properties from two or more data sources that are common to at least two system users from the user data.

At step 440, the method selects a first combination of two or more common properties (e.g., common data values for two or more properties, also referred to herein as "common characteristics") identified in step 430. At step 450, the method determines whether the number of system users having the combination of common properties exceeds (e.g., is greater than or equal to) a predetermined threshold. In particular, step 430 may determine the number of system users having the combination of common properties and compare it with a predetermined threshold. The predetermined threshold may represent a minimum number of individual system users, who have a combination of common characteristics and have been granted access by previous overrides, that corresponds to a desired degree of confidence that a ruleset update, based on the combination of common characteristics, should be performed. In other words, the threshold number indicates a degree of confidence that the system users were granted override access by virtue of their shared combination of common characteristics. The predetermined threshold may be a default number, configurable by the user (e.g., system administrator) based on application and/or user requirements, such as a desired degree of confidence and/or policies (e.g., security policy).

If step 450 determines that the number of system users having the combination of common properties does not exceed the predetermined threshold, the method proceeds to step 470. However, if step 450 determines that the number of system users having the combination of common properties does exceed the predetermined threshold, the method proceeds to step 460.

At step 460, the method updates the membership ruleset for access in the context to include rules based on the combination of common properties (i.e., the same data attributes/common characteristics). In particular, step 460 may define new rules in the ruleset for the context, based on the identified combination of common data values for properties of user data from the relevant data source(s). Step 460 may update the ruleset using the combination of common properties according to application and/or user requirements. An example of how step 460 may update a ruleset based on an identified combination of common properties is set out below.

At step 470, the method determines whether there are further combinations identified in step 430 to consider. If step 470 determines that there are further identified combinations to consider, the method returns to step 440, which selects the next identified combination of common user data properties. The method then continues in a loop through step 440 to 460 until there are no further identified combinations to consider. If step 470 determines that there are no further identified combinations to consider, the method proceeds to step 480.

At step 480, the method stores the updated membership ruleset for the context. The updated membership ruleset may be used by a user access control subsystem for controlling future access in the context. The method then ends at step 485.

As the skilled person will appreciate, various modifications may be made to the method of FIG. 4. In particular, steps 420 to 450 may be modified or combined using any suitable technique or algorithm. Thus, for example, a single step may be used to identify properties of unique system users in the retrieved user data that occur at least the threshold number of times, and all identified properties in combination may be used for updating the ruleset in step 460.

Moreover, the method of FIG. 4 may include one or more additional steps. For instance, additional steps may require a system administrator (or equivalent) to approve an update to a ruleset. Such additional steps may be performed before or after step 480. As the skilled person will appreciate, various other modifications of the method of FIG. 4 are possible and contemplated by the present disclosure.

By way of example, the method 400 of FIG. 4 may update the above membership ruleset "IMS Experts", for access to a resource in the context when the IMS server is not functioning correctly (i.e., "IMS Emergency"). In particular, step 420 may analyze retrieved user data for previous access overrides in the context of an "IMS Emergency". In the example, the following combination of common data values of user properties:

"employee_directory:grade>=9"

(datasource=<employee_directory>) and "publications:keywords->contains("ims")" (data source=<publications>).

This combination of two common user data properties occurred three times (i.e., both data property values were present in the user data of three individual system users) for overrides in the context "IMS Emergency". In the present example, the predetermined threshold for the number of users, for all properties from all data sources, is three.

The membership ruleset "IMS Experts" may be updated in step 450, by specifying new rules based on the above combination of common data values for properties (shown in bold) as follows:

---

"IMS Experts": [
  [
    {
      "datasource": "employee_directory",
      "rules": [
        [ {"team": "imsDevelopment", "condition": "equals"} ]
      ]
    }
  ],
  [
    {
      "datasource": "employee_directory",
      "rules": [
    [ {"grade": "9", "condition": "greater|equal"} ]
      ]
    },
    {
      "datasource": "publications",
      "rules": [
        [ {"keywords": "ims", "condition": "contains"} ,
  {"level": "expert", "condition": "equals"} ]
      ]
    },
    {
      "datasource": "historical_activity",
      "rules": [
        [ {"context": "IMS Emergency", "condition": "equal"}
  ]
      ]
    }
  ]
]

---

Thus, the rules in bold in the above updated ruleset are added to the original ruleset identifying "imsDevelopment" team users, to additionally permit automatic access in the "IMS Emergency" context to system users who satisfy the criteria: (i) are at least grade band 9; (ii) are name authors of expert level ims-related publications, and (iii) have previously been granted access in the "IMS Emergency" context. As the skilled person will appreciate, the above is just one example of how that above ruleset may be updated. For example, criteria (iii) may be omitted to permit automatic access to all system users satisfying the combination of criteria (i) and (ii), irrespective of whether they have previously been granted access by system administrator overrides.

As the skilled person will appreciate, many different techniques for using common data properties amongst users previously granted access by system administrator overrides in a particular context are possible and contemplated by the present disclosure.

Figure 5:
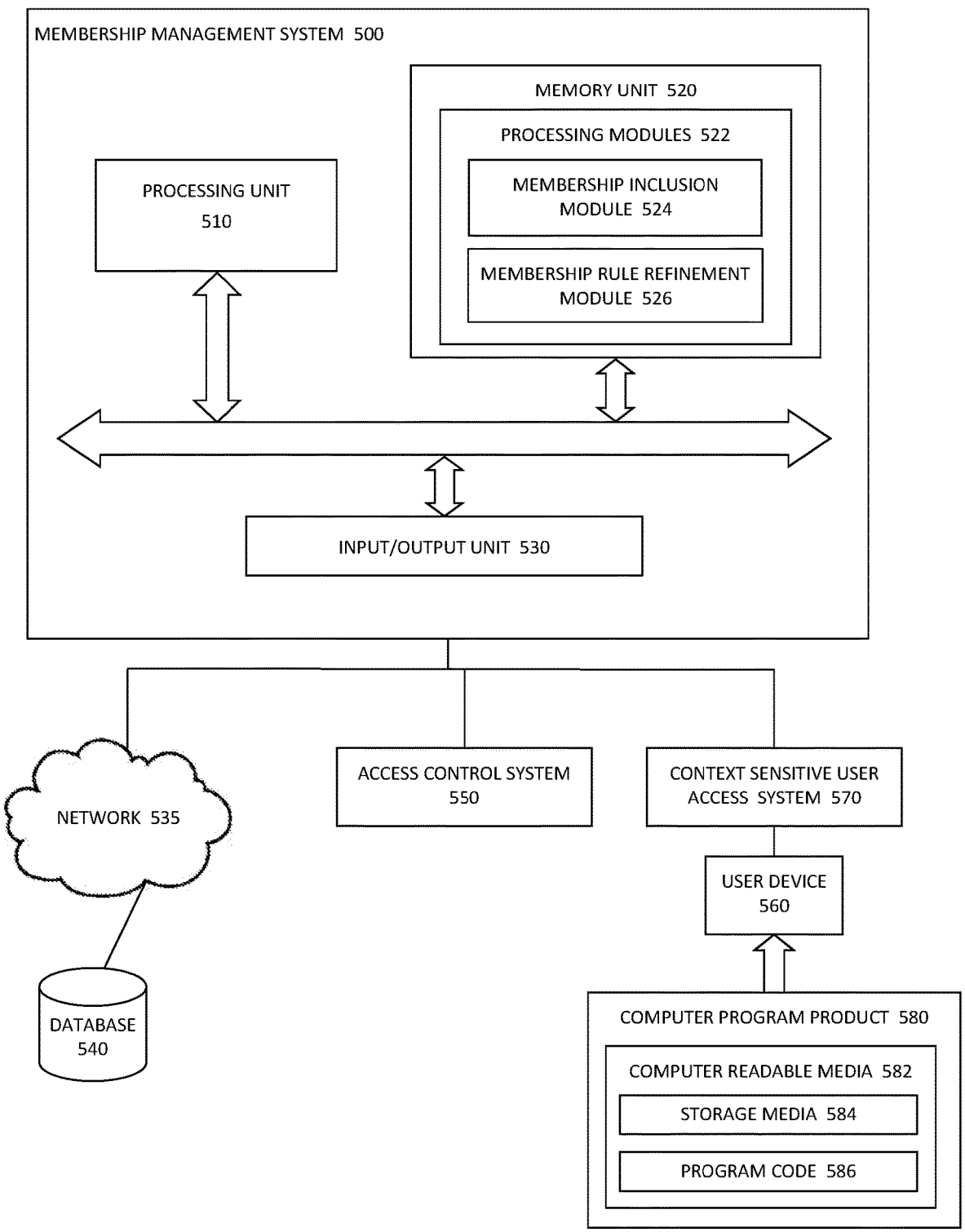
FIG. 5 is a block diagram of a system for context-sensitive access management in accordance with example implementations of the present disclosure.

FIG. 5 is a block diagram of a membership management system 500 for context-sensitive access control management in accordance with example implementations of the present disclosure. In some example implementations, membership management system 500 may be used as the membership management subsystem 30 of the system 10 of FIG. 1 as described above.

Membership management system 500 comprises a processing unit 510, a memory unit 520 and an Input/Output (I/O) unit 530. Membership management system 500 is configured to send data to, and receive data from, external systems and devices via I/O unit 530 for managing membership of user access groups. Such user access groups each comprise a subset of system users, who are permitted automatic access to resources in a plurality of contexts, by compliance with corresponding rulesets. In particular, in the example implementations illustrated in FIG. 5, membership management system 500 is coupled to a network 535 such as a local area network, wide area network or the Internet, for access to at least one database 540 comprising user profile data derived from one or more data sources (not shown). Examples of suitable data sources for user profile data are described above in relation to FIG. 1. In addition, membership management system 500 is coupled to an access control system 550. Access control system 550 performs context-sensitive access control using access groups comprising lists of system users, who are permitted access by virtue of compliance with rulesets for a plurality of contexts. Finally, membership management system 500 is coupled to a context-sensitive user access system 570, which may perform context detection and configuration and include databases for the plurality of contexts, the corresponding rulesets and associated lists, as described above. A user device 560 may be coupled to the context-sensitive user access system 570 for use by a system administrator. The system administrator may manually define and update a plurality of contexts for user access control, as well as criteria/rules for access to resources in the plurality of contexts, as described above in relation to FIG. 1.

In the example implementation illustrated in FIG. 5, memory unit 520 stores a plurality of processing modules 522. The processing modules 522 comprise program instructions (i.e., program code) for execution by processing unit 510 for managing membership of user access groups and corresponding rulesets for accessing resources according to context. In particular, processing modules 522 includes membership inclusion module 524 and/or membership rule refinement module 526. Membership inclusion module 524 may be configured to apply a current (e.g., updated) ruleset for automatic access to a resource in a context to user data for the system users, in order to determine membership of a user access group comprising a subset (e.g., list) of system users who are permitted automatic access for the context. In accordance with example implementations, membership inclusion module 524 may perform the method of FIG. 2, as described above. Membership rule refinement module 526 may be configured to monitor for system administrator access overrides of a ruleset for automatic access to a resource in a context. In accordance with example implementations, membership rule refinement module 526 may perform the method of FIG. 3, as described above. Furthermore, membership rule refinement module 526 may be configured to update a ruleset for automatic access to a resource in a context, in response to detection of a condition for an update of the ruleset. In accordance with example implementations, membership rule refinement module 526 may perform the method of FIG. 4, as described above.

In example implementations of the present disclosure, a computer program product 580 may be provided, as shown in FIG. 5. The computer program product 580 may include a computer readable media 582 having storage media 584 and program instructions 586 (i.e., program code) embodied therewith. The program instructions 586 may be loaded onto the memory unit 520 of membership management system 500 via I/O unit 530. For example, a system administrator using the user device 560 of the context-sensitive user access system 570 may load the program instructions 586 onto the memory unit 520. The program instructions 586 may comprise one or more of the above-described processing modules, in particular the membership inclusion module 524 and/or the membership rule refinement module 526. The program instructions 586 may be executable by the processing unit 510 of membership management system 500 for managing system user access groups and corresponding rulesets for accessing resources according to context, as described above with reference to FIGS. 2, 3 and 4.

Accordingly, the present disclosure enables a ruleset, defining criteria for membership of a user access group for automatically accessing resources in a context, to be dynamically refined and updated. In example implementations, this is achieved by a rule refinement module or subsystem, which effectively runs the access control process in reverse. The access ruleset may be updated based on observations of system users being granted access to resources in different contexts via administrative overrides (i.e., exceptions outside the automatic access granted by this system). The observations may be correlated with user data for those system users, who have been granted override access, which may be retrieved from various data sources. Shared characteristics of the system users, who have been granted override access, may be identified for use as additional criteria for automatic access. Thus, through the use of machine learning and multiple sources of user data, trends may be identified through exceptions providing override access to different system users in a particular context (e.g., multiple consecutive exceptions or multiple exceptions within a limited time period). The ruleset may be updated based on the identified trends, to enable automatic access by such system users in future. Thus, in example implementations, a membership inclusion module or subsystem effectively runs the access control process forwards, using updated rulesets and current user data from multiple data sources, to control automatic access to resources for different contexts.

By using multiple data sources, example implementations of the present disclosure (e.g., membership inclusion module 32 of FIG. 1) may identify system users who satisfy certain membership criteria, and thus membership rulesets that are associated with multiple data sources, in the case of error or omission in a single data source. Moreover, by identifying trends and additional criteria, example implementations of the present disclosure (e.g., membership rule refinement module 34 of FIG. 1) may define improved rulesets, which capture more system users, who should have access to resources in different contexts.

Whilst the described example implementations of the present disclosure relate to control of access to computing resources in a computing environment, the skilled person will appreciate that the principles may be applied in other situations, such as industrial or business environments, in which access is automatically controlled by criteria or rules.

The present disclosure encompasses a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some example implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to example implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various example implementations of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various example implementations of the present disclosure have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the example implementations, the practical application or technical improvement over technologies found in the marketplace, or to enable others of ordinary skill in the art to understand the implementations disclosed herein.

What is claimed is:

1. A computer-implemented method, comprising:
obtaining user data relating to a plurality of system users, who have previously been granted access to a resource in a context without complying with a ruleset defining criteria for automatically accessing the resource in the context;
identifying a combination of two or more user data properties having common values in the user data of a subset of two or more of the plurality of system users;
determining whether a number of system users in the subset exceeds a predetermined threshold; and
updating, if the number of system users in the subset exceeds the predetermined threshold, the ruleset to include defining criteria based on the identified combination of two or more user data properties comprises defining a criterion for each user data property of the two or more user data properties, the criterion specifying a user data property and the common value in the subset.

2. The method of claim 1, wherein
each criterion of the ruleset specifies the user data property, a value of the user data property and a condition relating to the specified value that must be met, wherein the condition is selected from the group consisting of:
equal to, less than, less than or equal to, greater than, greater than or equal to, and contains.

3. The method of claim 1, further comprising:
monitoring access to the resource in the context by system users;
identifying a system user granted access to the resource in the context without complying with the ruleset based on the monitoring; and
storing, in memory, an identifier of the system user in a data record associated with user access overrides of the ruleset.

4. The method of claim 3, wherein
the obtaining comprises:
retrieving, from the memory, identifiers of a plurality of system users in data records associated with user access overrides of the ruleset; and
using the identifiers of the system users to obtain the user data from at least one data source.

5. The method of claim 1, wherein
the updating starts in response to a determination that a condition for updating the ruleset for a context is met.

6. The method of claim 5, wherein
the condition is selected from the group consisting of:
a predetermined number of system users have been granted access in the context without complying with the ruleset in a predetermined time interval;
a predetermined time interval has passed since a previous update; and
a user request to update the ruleset.

7. The method of claim 1, wherein
the user data for each system user is obtained from a plurality of data sources.

8. The method of claim 1, wherein
the user data for each system user comprises a user identifier and values of one or more properties relating to the profile of the user.

9. A system, comprising:
a processing unit for updating user access rulesets, the processing unit in communication with memory and at least one data source and configured to:
obtain, from a data source, user data relating to a plurality of system users, who have previously been granted access to a resource in a context without complying with a ruleset defining criteria for automatically accessing the resource in the context;
identify a combination of two or more user data properties having common values in the user data of a subset of two or more of the plurality of system users;
determine whether a number of system users in the subset exceeds a predetermined threshold; and
update, if the number of system users in the subset exceeds the predetermined threshold, the ruleset to include criteria based on the identified combination of two or more user data properties by defining a criterion for each user data property of the two or more user data properties, the criterion specifying a user data property and the common value in the subset.

10. The system of claim 9, wherein
each criterion of the ruleset specifies, the user data property, a value of the user data property and a condition relating to the specified value that must be met, wherein the condition is selected from the group consisting of:
equal to, less than, less than or equal to, greater than, greater than or equal to, and contains.

11. The system of claim 9, wherein
the processing unit is further configured to:
monitor an access control subsystem;
identify a system user, who is granted access to the resource in the context without complying with the ruleset defining criteria for automatically accessing the resource in the context, based on the monitoring; and
store, in memory, an identifier of the system user in a data record associated with user access overrides of the ruleset.

12. The system of claim 11, wherein the processing unit is configured to obtain by: retrieving, from the memory, identifiers of a plurality of system users in data records associated with user access overrides of the ruleset; and using the identifiers of the system users to obtain the user data from the at least one data source.

13. The system of claim 9, wherein
the processing unit is configured to:
receive a determination that a condition for updating the ruleset for a context is met.

14. The system of claim 13, wherein
the condition is selected from the group consisting of:
a predetermined number of system users have been granted access in the context without complying with the ruleset in a predetermined time interval;
a predetermined time interval has passed since a previous update; and
a user request to update the ruleset.

15. The system of claim 9, wherein
the user data for each system user is obtained from a plurality of data sources, and comprises a user identifier and values of one or more properties relating to the profile of the user.

16. The system of claim 9, further comprising:
a processing unit for determining membership of user access groups for accessing resources in one or more contexts, the processing unit in communication with memory and at least one data source and configured to:
receive the updated ruleset defining criteria for automatically accessing the resource in the context;
receive user data for system users from at least one data source; and
determine a subset of system users, forming the user access group, who meet the criteria for automatically accessing the resource in the context, by applying the updated ruleset to the user data.

17. A computer program product comprising a computer readable storage medium having program instructions embodied therewith, wherein
the program instructions are executable by a processor to cause the processor to:
obtain user data relating to a plurality of system users, who have previously been granted access to a resource in a context without complying with a ruleset defining criteria for automatically accessing the resource in the context;
identify a combination of two or more user data properties having common values in the user data of a subset of two or more of the plurality of system users;
determine whether a number of system users in the subset exceeds a predetermined threshold; and
update, if the number of system users in the subset exceeds the predetermined threshold, the ruleset to include defining criteria based on the identified combination of two or more user data properties comprises defining a criterion for each user data property of the two or more user data properties, the criterion specifying a user data property and the common value in the subset.

* * * * *